(12) United States Patent
Wojciechowski et al.

(10) Patent No.: US 7,770,298 B1
(45) Date of Patent: Aug. 10, 2010

(54) SECUREMENT ARRANGEMENT FOR A LEVEL END CAP

(75) Inventors: Timothy J. Wojciechowski, Hubertus, WI (US); William G. Johnson, Mequon, WI (US)

(73) Assignee: Johnson Level & Tool Mfg. Co., Inc., Mequon, WI (US)

( * ) Notice: Subject to any disclaimer, the term of this patent is extended or adjusted under 35 U.S.C. 154(b) by 173 days.

(21) Appl. No.: 12/101,618

(22) Filed: Apr. 11, 2008

(51) Int. Cl.
*G01C 9/00* (2006.01)
*G01C 9/24* (2006.01)

(52) U.S. Cl. .................. 33/365; 33/451; 33/739

(58) Field of Classification Search .......... 33/365, 33/379, 451, 377–378, 381–382, 389–390, 33/347–348, 370–371
See application file for complete search history.

(56) References Cited

U.S. PATENT DOCUMENTS

| 4,463,501 | A * | 8/1984 | Wright et al. ............. 33/350 |
| 5,412,876 | A * | 5/1995 | Scheyer .................. 33/379 |
| 5,709,034 | A * | 1/1998 | Kohner ................... 33/377 |
| 6,418,634 | B1 * | 7/2002 | Szumer ................... 33/365 |
| 6,430,827 | B2 * | 8/2002 | Ruther ................... 33/451 |
| 6,675,490 | B1 * | 1/2004 | Krehel et al. ............. 33/382 |
| 6,792,686 | B2 * | 9/2004 | Krehel et al. ............. 33/382 |
| 6,988,320 | B2 * | 1/2006 | Kallabis et al. ............ 33/365 |
| 7,150,106 | B2 * | 12/2006 | Kallabis et al. ............ 33/365 |
| 2001/0013176 | A1 * | 8/2001 | Ruther .................... 33/451 |
| 2005/0223577 | A1 * | 10/2005 | Scarborough ............. 33/379 |
| 2006/0248738 | A1 * | 11/2006 | Tran et al. ................ 33/451 |
| 2007/0175056 | A1 * | 8/2007 | Tran et al. ................ 33/451 |
| 2007/0234581 | A1 * | 10/2007 | Ming .................... 33/451 |
| 2010/0000105 | A1 * | 1/2010 | Zhang et al. .............. 33/365 |
| 2010/0000106 | A1 * | 1/2010 | Zhang et al. .............. 33/365 |

* cited by examiner

*Primary Examiner*—Yaritza Guadalupe-McCall
(74) *Attorney, Agent, or Firm*—Boyle Fredrickson, S.C.

(57) ABSTRACT

An end cap feature for a level includes a frame having a gauging surface and a web which extends at an angle relative to the gauging surface. The web includes a recess adjacent to an end of the frame. The web recess opens onto the end of the web and extends inwardly therefrom. An end member includes a web-receiving such as a slot defined between a pair of side members, each of which is formed with an opening. The web recess and the end member openings are in alignment with each other when the end of the web is received within the web-receiving structure. A retainer member is positioned within the web recess when engaged within the opening of the end member, and the retainer member and web recess are configured such that engagement of the retainer member within the web recess maintains the end member in engagement with the web. Engagement of the retainer member within the opening of the end member prevents movement of the end member relative to the web.

15 Claims, 4 Drawing Sheets

SECUREMENT ARRANGEMENT FOR A LEVEL END CAP

BACKGROUND AND SUMMARY OF THE INVENTION

This invention relates to a tool such as a level, and more particularly to an end cap feature for a level.

A level generally includes at least one bubble vial secured to a frame or a rail of the level. The bubble vial provides an indication as to the orientation of the level, e.g., relative to a horizontal, vertical, or a diagonal plane. The vial contains a quantity of fluid and a bubble, and the user views the position of the bubble within the vial to ascertain the position of the tool relative to the desired plane. A level may also have any other satisfactory means for indicating the orientation of the level relative to a plane, such as an electronic indicator.

A level typically has end caps secured to the end of the frame, which serve to protect the ends of the level since the level may be subjected to rough operating and storage conditions, e.g. on a construction site.

It is an object of the present invention to provide a level with an end cap that can be detachably fastened simply and quickly and without the use of additional materials and special tools.

In accordance with one aspect of the invention, a tool such as a level includes a frame that defines a gauging surface. The ends of the frame have a web, which extends at an angle relative to the gauging surface and which includes a recess adjacent to the end. The web recess opens onto the end of the web and extends inwardly therefrom. An end member including web-receiving structure is engageable with the web. The end member includes an opening, which is aligned with the web recess when the end of the web is received within the web-receiving structure. A retainer member is positioned within the web recess and within the opening of the end member, and the retainer member and web recess are configured such that engagement of the retainer member within the web recess maintains the end member in engagement with the web.

In a preferred form, the retainer member extends through the opening and is configured to occupy substantially the entirety of the opening. In at least one embodiment of the present invention, the retainer member includes a transverse recess. The retainer member may include a pair of retainer member sections that are positioned within the opening from opposite sides defined by the end member, and which are configured for engagement with each other to so as to maintain the retainer member sections within the end member opening.

The web recess may include one or more indentations located inwardly of the end of the web, which extend outwardly from the opening in an outward direction and are configured to receive engagement structure defined by the retainer member. Engagement of the retainer member within the opening of the end member and with the indentations of the recess prevents movement of the end member relative to the web.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
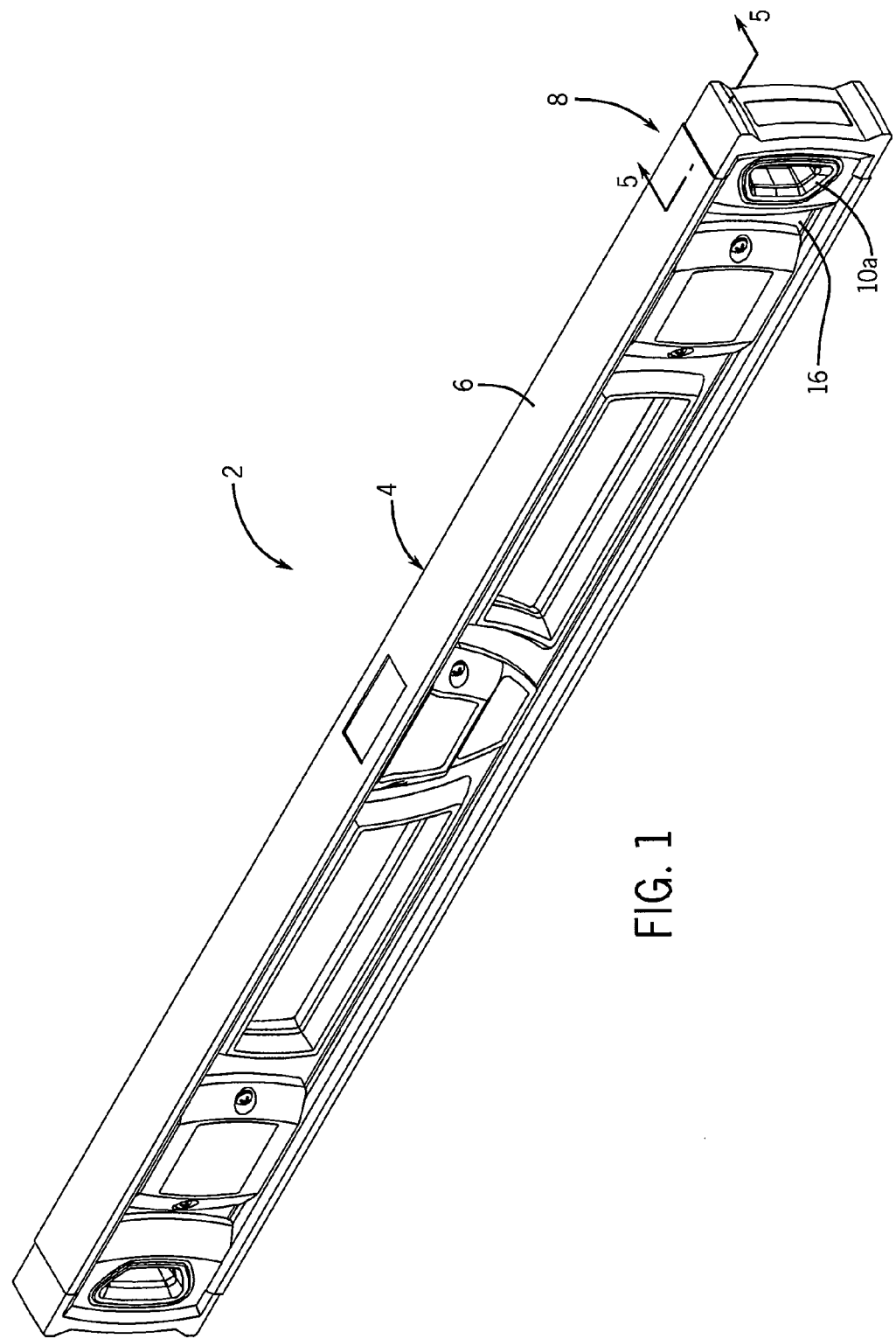
FIG. 1 is an isometric view of a tool such as a level incorporating the end cap securement arrangement of the present invention.

FIG. 1 illustrates a tool such as a level 2 which includes a frame 4 that includes a pair of flanges, each of which defines a gauging surface such as 6, and a web located between the flanges. In accordance with the present invention, an end member 8 is engaged with the end of the level 2, by a retaining member 10 engaged within an opening in the end member 8.

Figure 2:
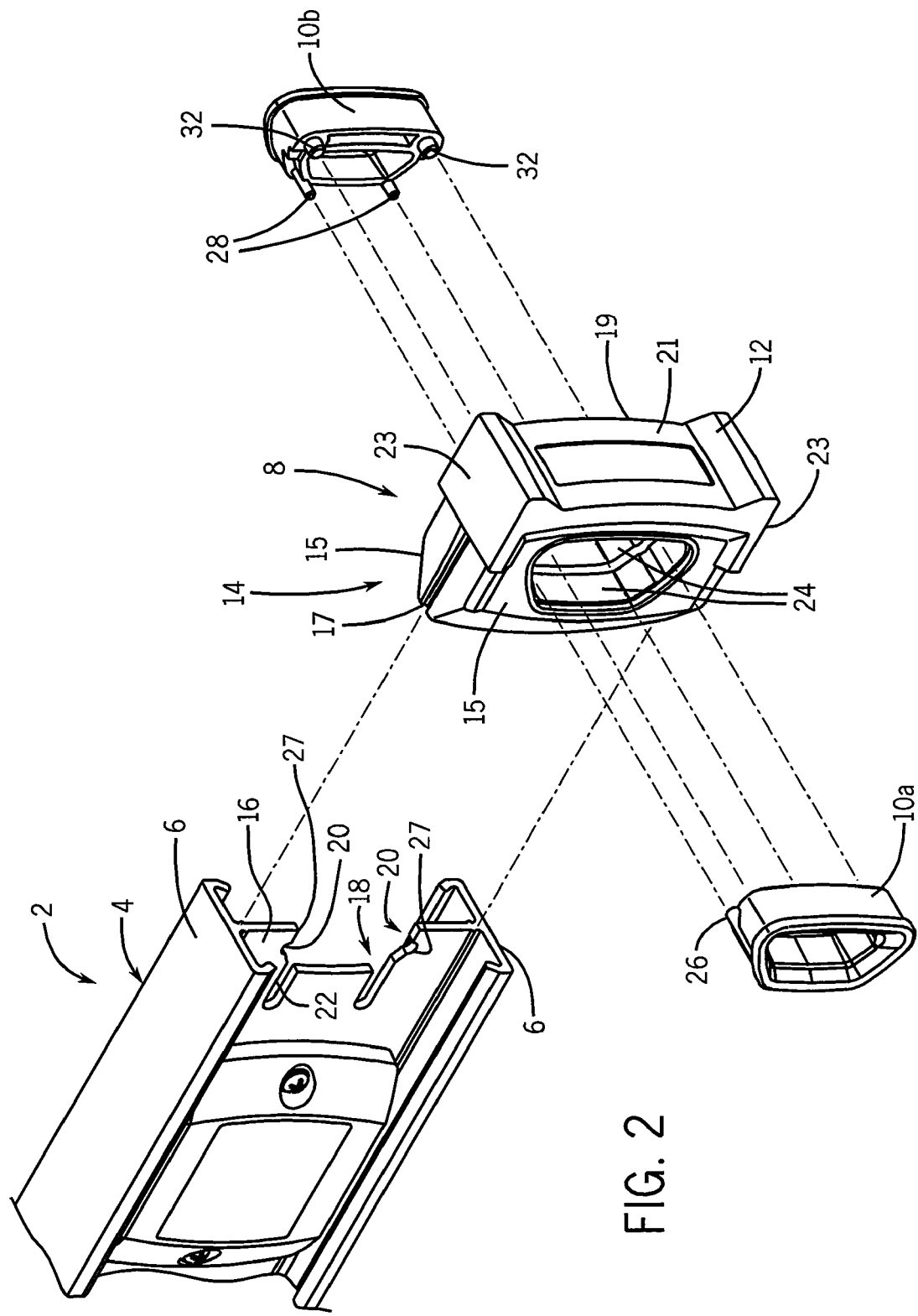
FIG. 2 is a partial exploded isometric view of the end member securement arrangement of the present invention incorporated into the level of FIG. 1, showing a pair of retainer members and a partial view of the end of the frame having a web recess.

FIG. 2 illustrates the securement arrangement for the end member 8, and a partial view of the frame 4 of the level 2. The frame 4 has a web 16 which extends between the flanges, and which defines an end. The web 16 extends at an angle relative to the gauging surface 6, and the web 16 includes a recess 18 adjacent the end. In the illustrated embodiment, the web 8 is oriented so as to be perpendicular to the gauging surface 6, although it is understood that the web 8 may be oriented at any other desired angle. The web recess 18 includes indentations 20 located inwardly of the end of the web 16, which extend laterally outwardly from the opening 18 at a location axially inwardly from the end of the web 18. The retainer member 10 includes engagement structure in the form of a pair of protrusions 26, which are configured to be engaged within the indentations 20.

The end member 8 includes a web-receiving structure 14 within which the end of the web 16 is received. In the illustrated embodiment, the web-receiving structure 14 is in the form of a pair of side portions 15 separated by a slot 17. The slot 17 as a width slightly greater than the thickness of web 16, which enables the end member 8 to be slid onto the end of the web 16 such that the side portions 15 are located against the oppositely facing side surfaces of the web 16. The end member 8 also includes an end area 19, which is configured to define an end surface 21 and a pair of laterally facing surfaces 23. In a manner as is known, the end member 8 is constructed so that the laterally facing surfaces 23 are located slightly inwardly from the gauging surfaces 6, so as not to interfere when the gauging surfaces 6 are placed on a work surface.

As is shown in FIG. 2, the side portions 15 of the end member 8 are formed with aligned openings 24 inwardly of end area 19. When the end member 8 is engaged with the web 16, the side portion openings 24 are in alignment with the web recess 18. With this construction, the side portion openings 24 and web recess 18 provide a passage that extends completely through end member 8 and level frame 4.

A pair of retaining members 10a, 10b are engageable within the openings 24 in the side portions 15 of the end member 8, from a pair of oppositely facing sides defined by the end member 8. The pair of retainer members 10a, 10b are positioned within the web recess 18 when engaged within the openings 24 of the end member 8, and are configured to be engaged together. The pair of retainer members 10a, 10b and web recess 18 are configured such that engagement of the pair of retainer members 10a, 10b within the web recess 18 maintains the end member 8 in engagement with the web 16. In this regard, the retainer members 10a and 10b and a shape that corresponds to that of side portion openings 24, such that the retainer members 10a and 10b occupy the entirety of openings 24.

Figure 3:
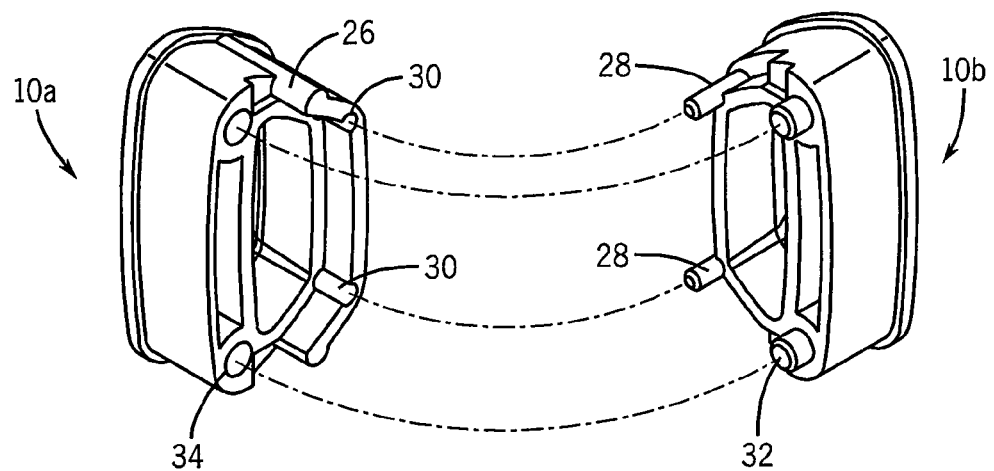
FIG. 3 is an isometric view of a pair of retainer members as in FIG. 2, showing the protrusions and indentations of the retainer members for securing the retainer members together.

As shown in FIG. 3, at least of the one retainer members, such as 10a, includes a pair of protrusions 26 configured to be received within the indentations 20 of the web recess 18. The web recess indentations 20 and the protrusions 26 are configured such that a portion of the web 16 outwardly of each web recess indentation 20 forms an end tab 27, which is in alignment with the retainer member protrusion 26 when the retainer members 10a and 10b are secured together. In this manner, the retainer members 10a and 10b function to maintain end member 8 in engagement with the web 16 of level frame 4. That is, in the event end member 8 is subjected to an axial pull-off force, engagement of the retainer member protrusions 26 with the end tabs 27 functions to prevent axial movement of end member 8 relative to the level frame 4. It is noted that, while retainer members 10a and 10b are shown and described as occupying the entirety of openings 24, the locking function provided by retainer members 10a and 10b can be accomplished by forming retainer members 10a and 10b so as to have generally the same width as openings 24, to prevent axial movement of end member 8 when subjected to an axial force. Retainer members 10a and 10b may have a height less than openings 24 if desired, while still performing the same locking function.

One of the retainer members, such as retainer member 10b, has a pair of generally cylindrical inwardly extending protrusions 28. The other retainer member, in this case retainer member 10a, has corresponding recesses 30, which are arranged such that the protrusions 28 are received within the recesses 30 when the pair of retainer members 10a, 10b are secured together. A second pair of protrusions 32 at the opposite end of the retainer member 10b are also engageable within a pair of recesses 34 on the retainer member 10a, to further retainer members 10a, 10b together. While the invention has been shown and described with respect to a pair of retainer members that are secured together within the side portion recesses 24 and the web recess 18, it is understood that a single retainer member, or any other desired number of retainer members, may be employed in place of a pair of retainer members.

Figure 4:
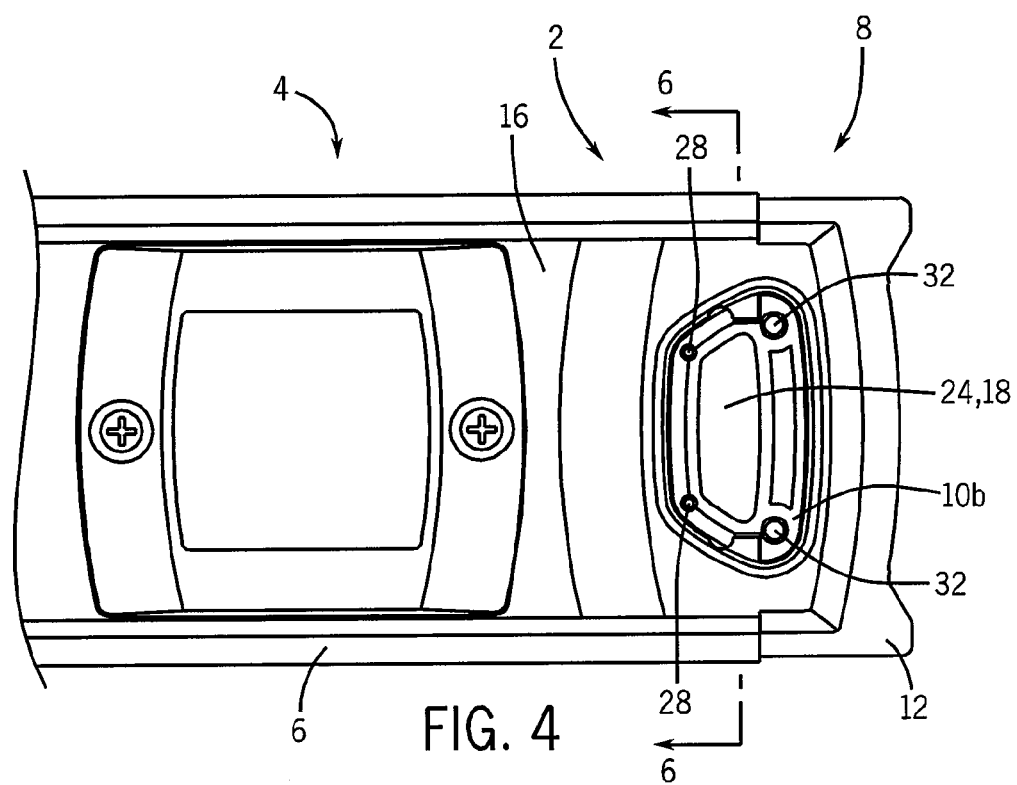
FIG. 4 is a side elevation view of an end portion of the level of FIG. 1, showing the retainer members engaged with the opening of the web recess of the frame and the opening of the end member.

FIG. 4 illustrates the end member 8 engaged with the web of the frame 6. The retainer members 10a and 10b are engaged with the overlapping area of the web 16 at the web opening 18 and the transverse openings 24 of the end member 8. The retainer members 10a and 10b act to lock the end member 8 to the end of the frame 6, as described above.

Figure 5:
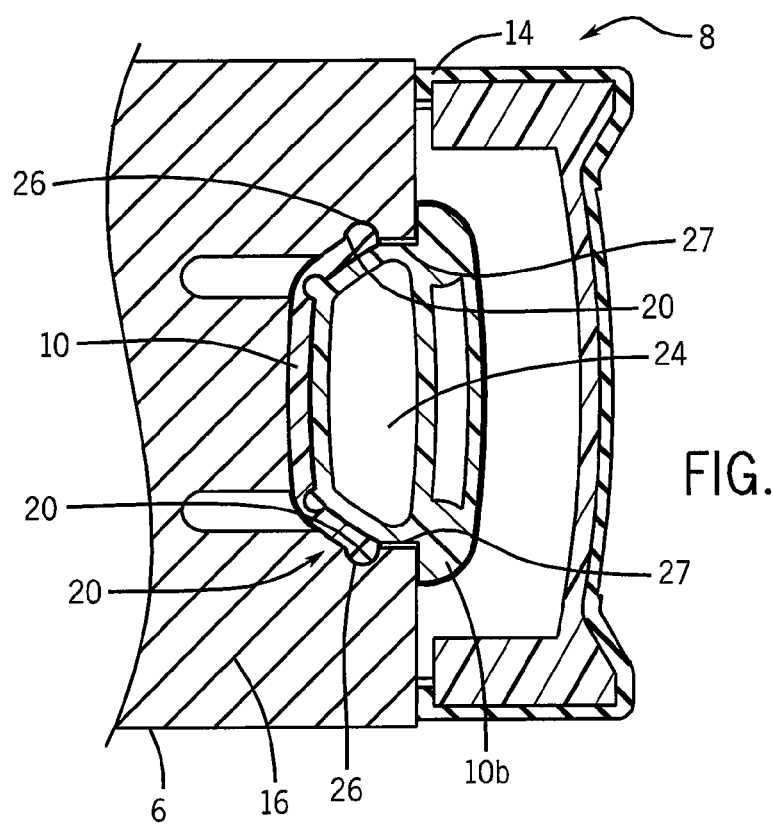
FIG. 5 is a partial cross-sectional side view of the end member securement arrangement as in FIG. 4, with the retainer members engaged with the opening of the web recess of the frame and the opening of the end member.

FIG. 5 is a partial longitudinal cross sectional illustration of the web 16 of the frame 6 in engagement with the end member 8 and the retaining members 10a and 10b.

Figure 6:
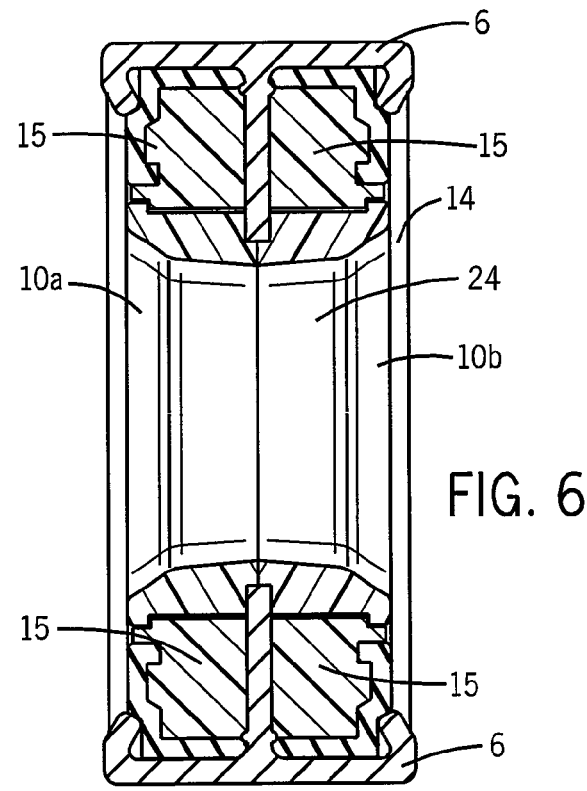
FIG. 6 is a cross-sectional view taken along line 6-6 of FIG. 4, showing the retainer members engaged with the opening of the web recess of the frame and the opening of the end member.

FIG. 6 is a transverse cross-sectional illustration of the retainer members 10a, 10b, engaged within the overlapping opening 18 of the web 16 and the end member openings 24.

In assembly, a frame having a web which includes an open area has an end member positioned so as to overlap the open area of the web. The end member includes a transverse opening which overlaps the open area of the web when the end member is engaged with the web. At least one retainer member is positioned within the transverse opening and within the open area of the web, and is configured so as to maintain the end member in engagement with the web. In at least one embodiment, there are a pair of retainer members that are secured together within the transverse opening of the end member.

Various alternatives and embodiments are contemplated as being within the scope of the following claims particularly pointing out and distinctly claiming the subject matter regarded as the invention.

We claim:

1. A level, comprising:
 a frame including a gauging surface and a web defining an end, wherein the web lies in a plane and extends at an angle relative to the gauging surface, and wherein the web includes a recess adjacent the end;
 an end member including web-receiving structure within which the end of the web is received upon movement of the end member toward the web in a direction along the plane of the web, wherein the end member includes an engagement portion having an opening, wherein the engagement portion of the end member overlaps the web inwardly of the end of the web, and wherein the web recess and the opening in the engagement portion of the end member are in alignment with each other when the end of the web is received within the web-receiving structure; and
 a retainer member that is engaged within the opening in the engagement portion of the end member and within the web recess when engaged within the opening in the engagement portion of the end member, wherein the retainer member is moved into engagement within the web recess and into the opening in the engagement portion of the end member by lateral movement of the retainer member in a direction transverse to the plane of the web, wherein the retainer member, the opening in the engagement portion of the end member, and the web recess include mating engagement structure that is configured such that engagement of the retainer member within the web recess and the opening in the engagement portion of the end member maintains the end member in engagement with the web against an axial force applied to the end member in a direction along the plane of the web.

2. A level according to claim 1, wherein the web recess opens onto the end of the web and extends inwardly therefrom.

3. A level according to claim 2, wherein the mating engagement structure includes one or more indentations defined by the web recess located inwardly of the end of the web, wherein the indentations extend outwardly from the opening in an outward direction and are configured to receive engagement structure defined by the retainer member.

4. A level according to claim 1, wherein the retainer member extends through the opening in the engagement portion of the end member and is configured to occupy substantially the entirety of the opening.

5. A level according to claim 1, wherein the retainer member comprises a pair of retainer member sections that are positioned within the opening in the engagement portion of the end member and within the web recess by lateral movement toward each other in a direction transverse to the plane of the web from opposite sides defined by the web and the end member, and which are configured for engagement with each other to so as to maintain the retainer member sections within the opening in the engagement portion of the end member and within the web recess.

6. A level according to claim 1, wherein the retainer member includes a transverse recess.

7. An end member securement arrangement for a level having a frame that includes a web that lies in a plane, comprising:
an open area in the web located adjacent an end defined by the web;
an end member configured for engagement with the web in a direction along the plane of the web, wherein the end member includes an engagement portion having an opening that overlaps the open area of the web when the end member is engaged with the web; and
retainer means engageable within the opening in the engagement portion of the end member and with the open area of the web for maintaining the end member in engagement with the web, wherein the retainer means is moved into engagement within the web recess and within the opening in the engagement portion of the end member by lateral movement of the retainer means in a direction transverse to the plane of the web, wherein the retainer means, the opening in the engagement portion of the end member, and the web recess include mating engagement structure that is configured such that engagement of the retainer means within the open area of the web and the opening in the engagement portion of the end member maintains the end member in engagement with the web against an axial force applied to the end member in a direction along the plane of the web.

8. An end member securement arrangement according to claim 7, wherein the retainer means is frictionally engaged with the end member and the web.

9. An end member securement arrangement according to claim 7, wherein the retainer means comprises a retainer member having a cross sectional shape that matches the configuration of the opening in the engagement portion of the end member.

10. An end member securement arrangement according to claim 9, wherein the retainer member includes a transverse passage and that defines a transverse passage through the end member when the retainer member is secured within the opening in the end member.

11. An end member securement arrangement according to claim 7, wherein the retainer means comprises a pair of retainer members configured to engage each other from a pair of oppositely facing sides defined by the end member by lateral movement toward each other in a direction transverse to the plane of the web.

12. An end member securement arrangement according to claim 7, wherein the open area in the web includes a recess that extends inwardly from the end of the web, and at least one outwardly extending indentation that extends outwardly from the recess, wherein the retainer means is engageable within the recess and includes a protrusion configured to be received within the indentation, and wherein the indentation and the protrusion are configured such that engagement of the protrusion within the indentation maintains the end member in engagement with the end of the web against an axial force applied to the end member in a direction along the plane of the web when the retainer means is engaged within the web recess and the opening in the engagement portion of the end member.

13. A method of securing an end member to a web associated with a frame of a level, comprising the acts of:
providing a frame having a web that lies in a plane, wherein the web includes an open area adjacent an end defined by the web;
positioning an end member in engagement with the web such that an engagement portion of the end member overlaps the open area of the web, wherein the engagement portion of the end member includes a transverse opening and wherein at least a portion of the end member opening is in overlapping relationship with at least a portion of the open area of the web; and
engaging one or more retainer members with the engagement portion of the end member and with the web by positioning the one or more retainer members laterally outwardly of the web and the engagement portion of the end member, and moving the one or more retainer members laterally inwardly toward the web and the engagement portion of the end member in a direction transverse to the plane of the web such that the one or more retainer members are positioned within the transverse opening of the engagement portion of the end member and within the open area of the web, wherein the one or more retainer members, the opening in the engagement portion of the end member, and the open area of the web include mating engagement structure that is configured such that engagement of the one or more retainer members within the open area of the web and the opening in the engagement portion of the end member maintains the end member in engagement with the web against an axial force applied to the end member in a direction along the plane of the web.

14. The method of claim 13, wherein the act of engaging one or more retainer members with the engagement portion of the end member is carried out by engaging a pair of retainer members together within the transverse opening of the engagement portion of the end member by lateral inward movement of the pair of retainer members toward each other in a direction transverse to the plane of the web from opposite sides of the web.

15. The method of claim 14, wherein the act of engaging one or more retainer members with the engagement portion of the end member is carried out by engaging one or more protrusions on the one or more retainer members within one or more outwardly extending indentations in the open area of the web.

* * * * *